(12) United States Patent
Su et al.

(10) Patent No.: US 8,546,697 B2
(45) Date of Patent: Oct. 1, 2013

(54) BUNDLED FLEXIBLE CIRCUIT BOARD BASED FLAT CABLE WITH WATER RESISTANT SECTION

(75) Inventors: Kuo-Fu Su, Taoyuan County (TW); Gwun-Jin Lin, Taoyuan County (TW); Chih-Heng Chuo, Taoyuan County (TW)

(73) Assignee: Advanced Flexible Circuits Co., Ltd., Taoyuan County (TW)

( * ) Notice: Subject to any disclaimer, the term of this patent is extended or adjusted under 35 U.S.C. 154(b) by 372 days.

(21) Appl. No.: 12/974,356

(22) Filed: Dec. 21, 2010

(65) Prior Publication Data

US 2012/0024576 A1      Feb. 2, 2012

(30) Foreign Application Priority Data

Aug. 2, 2010   (TW) .............................. 99125647 A

(51) Int. Cl.
*H05K 1/00*      (2006.01)

(52) U.S. Cl.
USPC ......................................................... 174/254

(58) Field of Classification Search
USPC ................. 174/254, 250, 255, 258, 260–262, 174/266, 268; 361/749, 764, 777, 803
See application file for complete search history.

(56) References Cited

U.S. PATENT DOCUMENTS 4,435,614 A * 3/1984 McAusland ................. 174/268

FOREIGN PATENT DOCUMENTS

| JP | 2005-325849 A | 11/2005 |
| JP | 2006-93510 A | 4/2006 |
| JP | 2010-16121 A | 1/2010 |
| JP | 2010-40929 A | 2/2010 |
| JP | 2010-141377 A | 6/2010 |
| KR | 10-2010-0007960 A | 1/2010 |

OTHER PUBLICATIONS

Communication From Japanese Patent Office Dated (Japanese Emporer Year 24) Jun. 19, 2012.
Communication From Korean Patent Office Dated Sep. 5, 2012.

* cited by examiner

*Primary Examiner* — Jeremy Norris
*Assistant Examiner* — Tremesha S Willis
(74) *Attorney, Agent, or Firm* — Rosenberg, Klein & Lee

(57) ABSTRACT

A flat cable includes an enclosure sleeve that encloses a selected section of a cluster section of a flexible substrate. The enclosure sleeve has opposite ends respectively coupled to a first water resistant member and a second water resistant member. Each water resistant member includes a base forming a hollow channel and an insertion end extending from the base. The insertion end is fit to an inside or outside wall of an end of the enclosure sleeve. The first water resistant member, the second water resistant member, and the enclosure sleeve are combined together to form a water resistant section. When the flexible substrate is subjected to a stretching force in an extension direction or a torque applied in a rotation direction, the flexible substrate is allowed to undergo relative displacement with respect to the first water resistant member, the second water resistant member, and the enclosure sleeve.

12 Claims, 5 Drawing Sheets

BUNDLED FLEXIBLE CIRCUIT BOARD BASED FLAT CABLE WITH WATER RESISTANT SECTION

FIELD OF THE INVENTION

The present invention relates to a bundled flexible circuit board based flat cable with water resistant section, and in particular to a combination of a water resistant member and an enclosure sleeve that is arranged at a selected section of a flexible substrate to form a water resistant section.

BACKGROUND OF THE INVENTION

A flexible substrate or a flexible flat cable has been widely used in various electronic devices, such as a digital camera, a camcorder, a notebook computer, a personal digital assistant, a translation device, and a mobile phone. The conventional structure of a flexible electronic flat cable arranges a plurality of electrical conductor that are respectively covered with an insulating jacket or coaxial cables in a juxtaposing manner to form a flat cable, which is combined with electrical connectors with soldering or formed as a plugging end to realize connection and transmission of electronic signals.

When a flexible flat cable is used in an electronic device, no special concern in respect of water resistance or waterproofness must be taken into account in an indoor environment. However, for an outdoor environment or for use in a special environment, such as picture taking or photographing in a shower room or in a rainy day, water resistance becomes an important concern. Generally speaking, for a design that does not provide an effective means for water resistance between a flexible flat cable and a host device or display screen of an electronic device, such as a mobile phone, water may flow along the flexible flat cable into the interior of the host device of the display screen of the electronic device.

To provide proper water resistance, conventionally, a conventional solution is arranging a rubber pad as a water resistant or sealing member between a shell of an electronic device and a flat cable, whereby with the tight engagement formed between the shell of the electronic device and the water resistant member, together with a waterproof adhesive applied thereto, water resistance can be effected. The insulation jacket of a conventional electronic cable is often of water resistance to some extents. However, such a conventional electronic cable is often of a large diameter, so that when a large number of such cables are bundled together, the flexibility of the whole bundled cables may get poor, leading to easy breaking, and eventually affecting the applications thereof.

SUMMARY OF THE INVENTION

The present invention aims to provide a water resistant structure at a jointing site between a flexible flat cable and an electronic device, which also features excellent flexibility of the flat cable to increase the operation cycles thereof. When the sizes of electronic devices get small and functions increased, a flat cable that connects between two electronic components must be structured to allow for folding or formed of a plurality of longitudinally slit components bundled together to be received through a hinge structure of a narrow passage. If a water resistant structure for such an arrangement is formed of a rubber pad set to cover the flat cable and then subjected to thermal pressing or high temperature injection molding to overlappingly attached to the flat cable, due to the difficult of such a process, and also due to the questionable reliability of mold for such a complicated operation, poor manufacturing quality may eventually lead to ineffective water resistance that allows water to flow along the bundled cable components of the flexible flat cable into the interior of a host device or a display screen of for example a mobile phone. This is particularly true for a rubber pad based water resistant structure that is applied to a mobile phone to serve as a hinge flat cable that connects between a host device and a display screen of the mobile phone, for it is extremely hard to realize excellent water resistance.

Thus, an objective of the present invention is to provide a bundled flexible circuit board based flat cable with water resistant section, which is structured to include a water resistant section at a selected section of a cluster of conductive lines formed in a flexible circuit substrate.

To achieve the above objective, the present invention provides a flat cable, which comprises an enclosure sleeve that encloses a selected section of a cluster section of a flexible substrate. The enclosure sleeve has opposite ends respectively coupled to a first water resistant member and a second water resistant member. Each of the water resistant members comprises a base forming a hollow channel and an insertion end extending from the base. The insertion end is fit to an inside wall or an outside wall of an end of the enclosure sleeve. The first water resistant member, the second water resistant member, and the enclosure sleeve are combined together to form a water resistant section arranged at a selected section of the flexible substrate. With the enclosure sleeve and the water resistant members being properly sized, when the flexible substrate is subjected to a stretching force in an extension direction of the flexible substrate or a torque applied in a rotation direction thereof, the flexible substrate is allowed to undergo relative displacement to some extents with respect to the first water resistant member, the second water resistant member, and the enclosure sleeve. With the flexible structure being enclosed by the enclosure sleeve that is made of a flexible material and received through a hinge structure, resistance against water penetration can be realized, and protection can also be realized for the flexible substrate to enhance flexibility and commercial value thereof.

BRIEF DESCRIPTION OF THE DRAWINGS

The present invention will be apparent to those skilled in the art by reading the following description of preferred embodiments of the present invention, with reference to the attached drawings, in which.

DETAILED DESCRIPTION OF THE PREFERRED EMBODIMENTS

Figure 1:
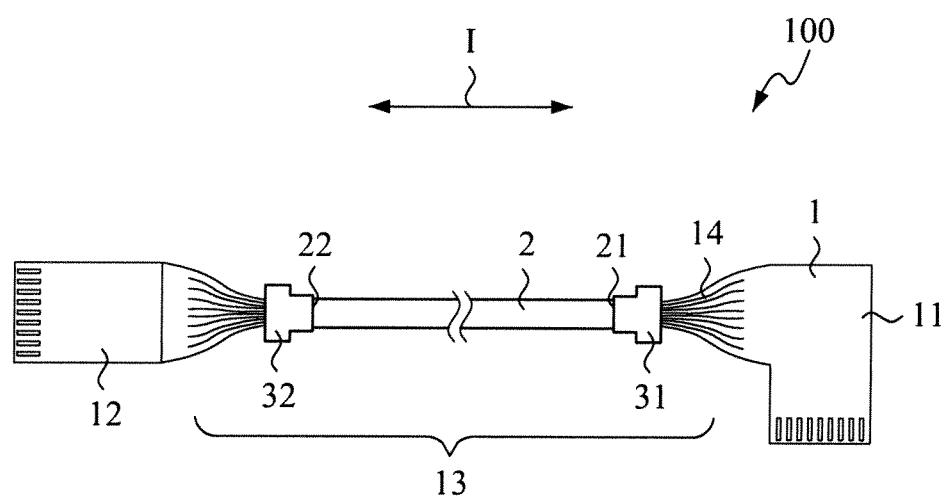
FIG. 1 is a schematic view showing a flexible circuit board based flat cable in accordance with the present invention.

With reference to the drawings and in particular to FIG. 1, the present invention provides a bundled flexible circuit board based flat cable with water resistant section, generally designated at 100, comprising a flexible substrate 1, which extends in an extension direction I and has a first end 11 and an opposite second end 12, which can be constructed in various forms, such as a plugging end, a socket, a soldered end, an open end, or a component carrying zone, as desired.

The flexible substrate 1 has a middle section or a selected section that is constructed as a cluster section 13. The cluster section 13 is composed of a plurality of clustered flat cable components 14 that is formed by slitting the flexible substrate 1 in the extension direction I. And, the flat cable components 14 are bundled to form a bundled arrangement. An enclosure sleeve 2 is provided to fit over a pre-determined portion of the cluster section 13 or at least a portion of the cluster section 13. The enclosure sleeve 2 is made of a material selected from a group including at least metal, plastics, silicon rubber, rubber, and silicon gel.

The enclosure sleeve 2 has a first end 21 and a second end 22, to which a first water resistant member 31 and a second water resistant member 32 are respectively mounted to ensure water resistance and protection for the portion of the flexible substrate 1 covered and enclosed by the enclosure sleeve 2. In other words, the first water resistant member 31, the second water resistant member 32, and the enclosure sleeve 2 collectively form a water resistant section on a selected portion of the flexible substrate 1. The first water resistant member 31 and the second water resistant member 32 can be made of materials selected from a group including silicon rubber, rubber, silicon gel, and resin.

Figure 2:
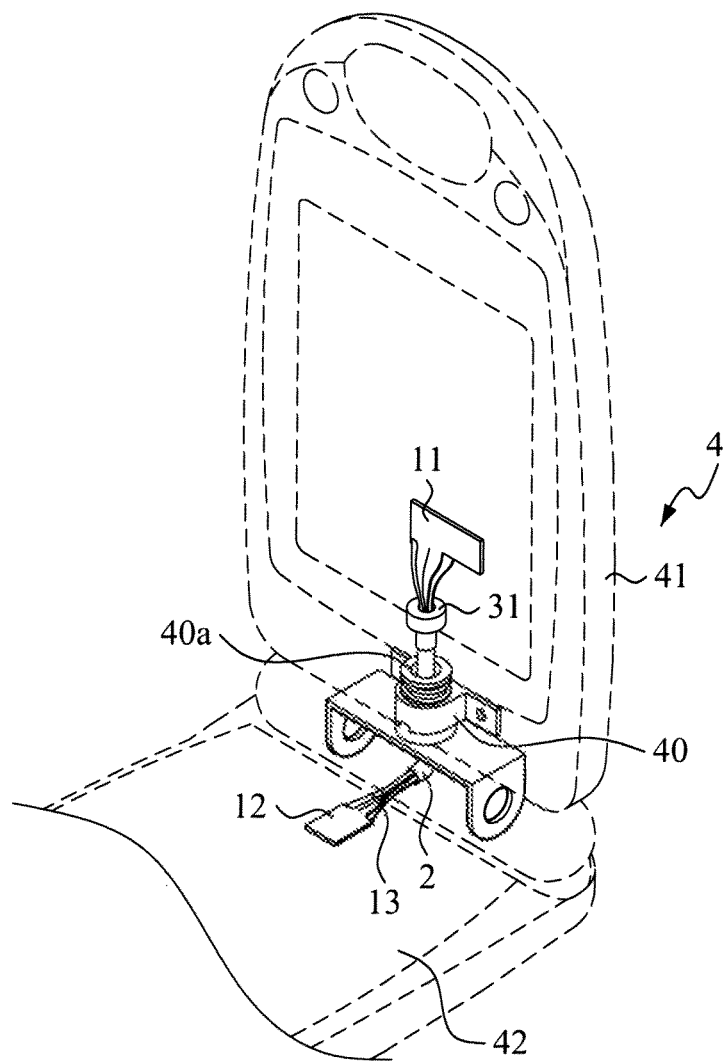
FIG. 2 is a perspective view showing an application of the flat cable according to the present invention that is received through a hollow portion of a hinge of an electronic device.

In a practical application, the flexible substrate 1 with the enclosure sleeve 2 fit thereto can be used as an independent component to be mounted in an electronic device or can be set through a hinge structure to connect two electronic components. An example is shown I FIG. 2, where the present invention is applied to an electronic device 4, such as a mobile phone, so that the flexible substrate 1 with the enclosure sleeve 2 fit thereto is positioned through a hollow portion 40a formed in a hinge 40 of the electronic device 4 to have the first end 11 of the flexible substrate 1 connected to a first component 41 of the electronic device 4 and the second end 12 of the flexible substrate 1 connected to a second component 42 of the electronic device 4.

Figure 3:
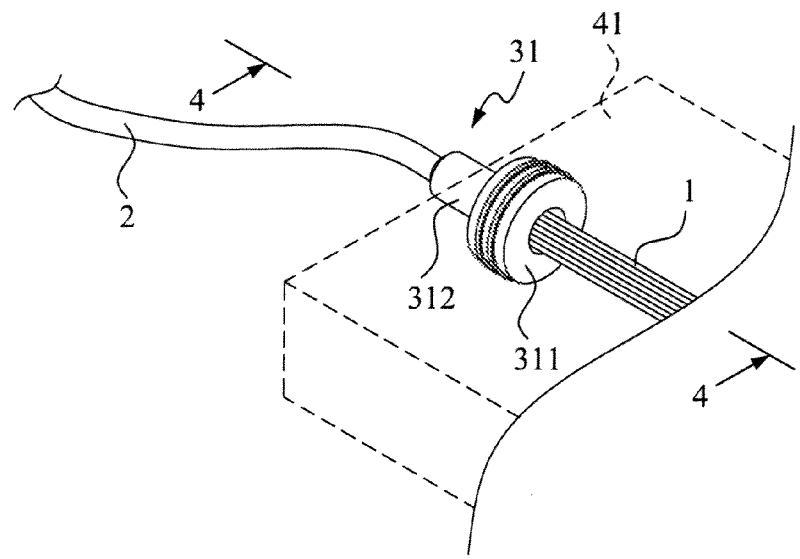
FIG. 3 is a perspective view showing a water resistant member according to the present invention set in an opening formed in a device shell.

The water resistant member (taking the first water resistant member 31 as an example for description) can be structured to mate an opening 411 formed in the first component 41 of the electronic device 4 (see FIG. 3 and FIG. 4) to prevent water from undesirably flowing into the interior of the first component 41 of the electronic device 4 so as to realize water protection.

The first water resistant member 31 comprises a base 311 forming a hollow channel 310 and an insertion end 312 extending from the base 311. The insertion end 312 is mountable to the first end 21 of the enclosure sleeve 2. The enclosure sleeve 2 has an inside wall 23 and an outside wall 24 and forms a passage 25. At least a gap is present between the inside wall 23 of the enclosure sleeve 2 and the flexible substrate 1 that is received through the passage 25 to allow for relative movement therebetween, whereby the flexible substrate 1 is allowed to undergo relative displacement with respect to the first water resistant member 31, the second water resistant member 32, and the enclosure sleeve 2 when subjected to a stretching force in the extension direction I and/or a torque applied in a rotation direction thereof.

Figure 4:
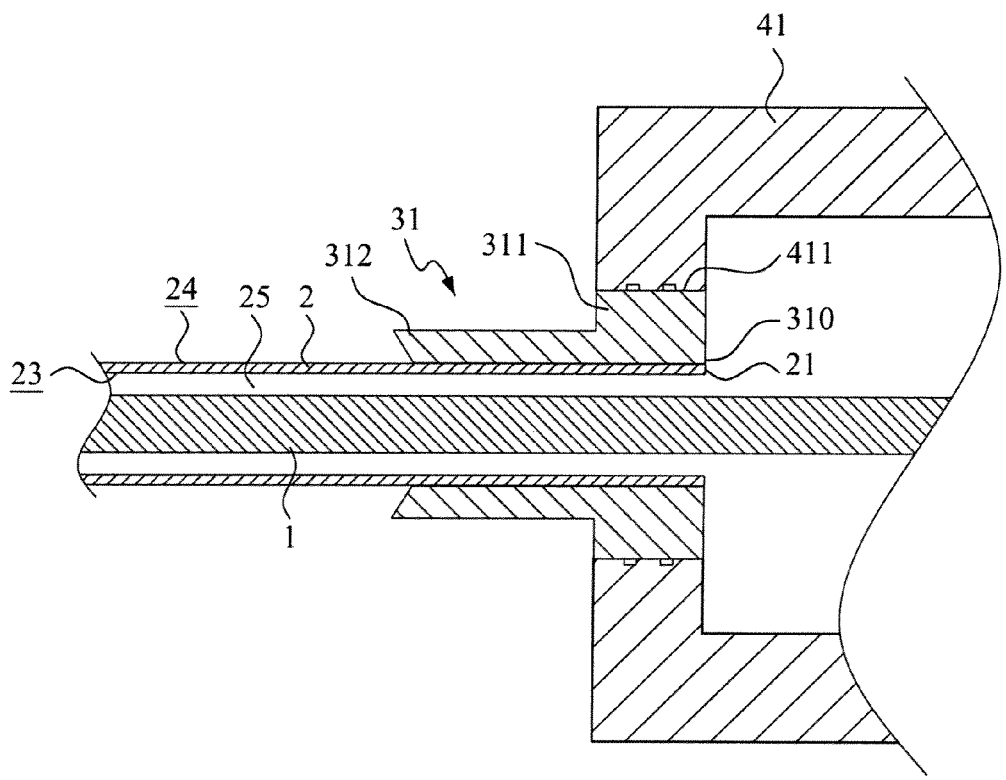
FIG. 4 is a cross-sectional view taken along line 4-4 of FIG. 3, showing an insertion end of the water resistant member is fit over an outside wall of a first end of an enclosure sleeve according to the present invention.
Figure 5:
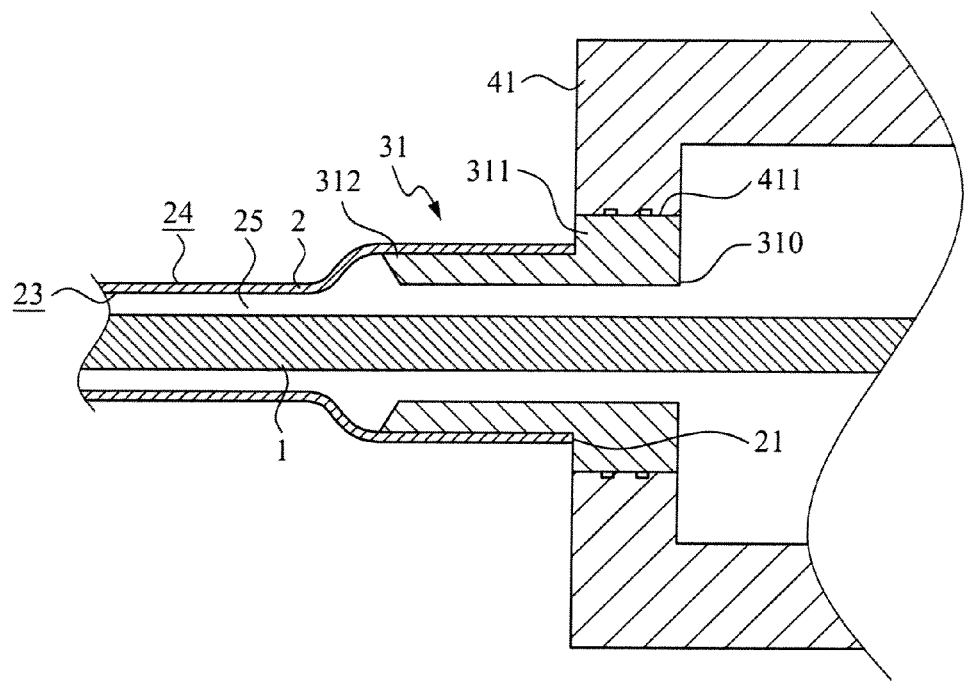
FIG. 5 is a cross-sectional view showing the insertion end of the water resistant member is fit into an inside wall of the first end of the enclosure sleeve according to a different embodiment of the present invention.

FIG. 4 shows that the insertion end 312 of the first water resistant member 31 is fit over an outer circumference of the outside wall 23 of the first end 21 of the enclosure sleeve 2. In an alternative embodiment, the insertion end 312 is fit into the inside wall 24 of the first end 21 of the enclosure sleeve 2 (as shown in FIG. 5). Similarly, the insertion end of the second water resistant member can be fit over the outside wall of the second end of the enclosure sleeve or alternatively fit into the inside wall of the second end of the enclosure sleeve.

Figure 6:
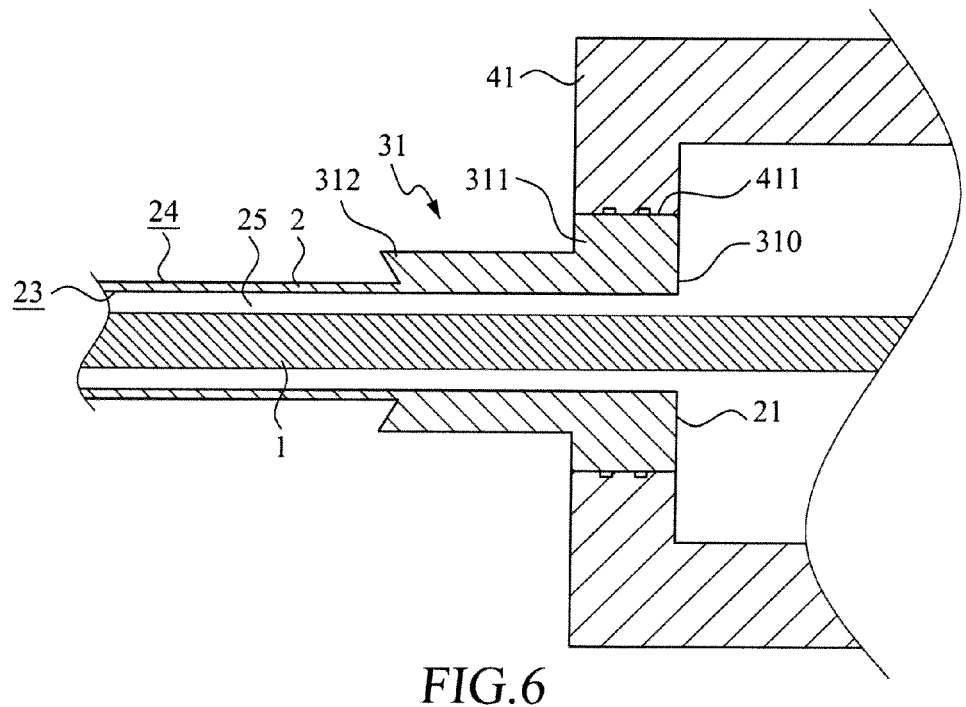
FIG. 6 is a cross-sectional view showing the insertion end of the water resistant member is integrally formed with the first end of the enclosure sleeve as a unitary member.

As shown in FIG. 6, in a further alternative embodiment, the insertion end 312 of the first water resistant member 31 and the first end 21 of the enclosure sleeve 2 are integrally formed together as a unitary member. Similarly, the insertion end of the second water resistant member can be integrally formed with the second end of the enclosure sleeve as a unitary member.

Figure 7:
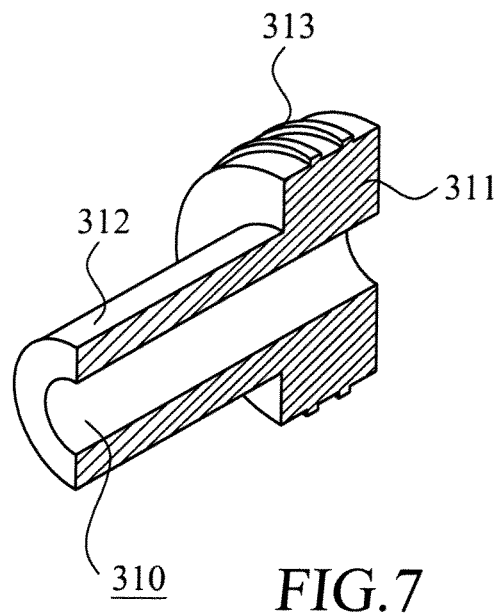
FIG. 7 is a perspective view, in a broken form, showing a base and an insertion end of a water resistant member are formed integrally as a unitary member according to the present invention.
Figure 8:
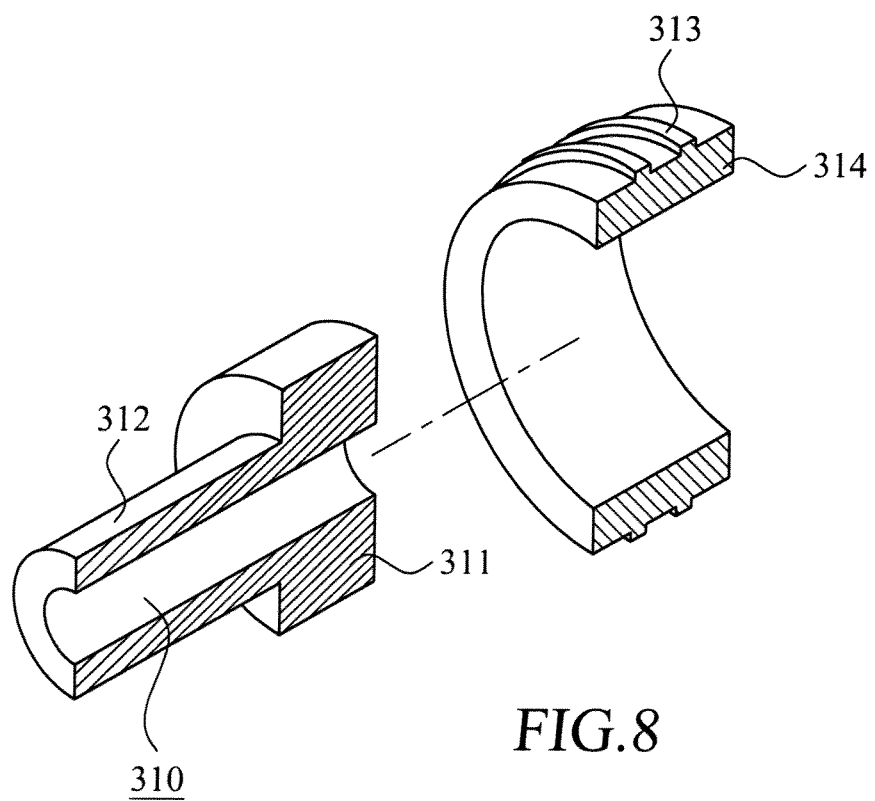
FIG. 8 is a perspective view, in a broken form, showing a base and an insertion end of a water resistant member are made separately as independent pieces according to the present invention.

Referring to FIG. 7, the base 311 and the insertion end 312 of the first water resistant member 31 are integrally formed together as a unitary member, and the base 311 has an outer circumferential surface forming at least one circumferential rib 313. It is apparent that, as an alternative form, the base 311 and the insertion end 312 are made separately as two independent components (as shown in FIG. 8), whereby the water resistant member further comprises an outer enclosure body 314. The outer enclosure body 314 encloses and covers an outer surface of the base 311 of the first water resistant member 31. The enclosure sleeve 2 can be made of the same material as the first water resistant member 31 and/or the second water resistant member 32 and integrally formed therewith.

The materials that are suitable for making the insertion end and the base of the water resistant member can be selected from a group comprising metal, plastic, resin, silicon rubber, rubber, and silicon gel, and the outer enclosure body is made of a material selected from a group including silicon rubber, rubber, silicon gel, and resin.

The base of the first water resistant member 31, the base of the second water resistant member, and the enclosure sleeve are made of circular contours as shown in the drawings, and alternatively, they can be of other shaped contours, such as rectangle, to meet the needs of applications in devices having different shell configurations.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A bundled flexible circuit board based flat cable with water resistant section, comprises:
   a flexible substrate, which has a first end and a second end and extends in an extension direction; and
   at least one cluster section, which is arranged at a selected section of the flexible substrate and comprises a plurality of flat cable components formed by slitting the flexible substrate in the extension direction;

characterized by comprising:
an enclosure sleeve, which has a first end and a second end, the enclosure sleeve enclosing the flexible substrate and covering at least a portion of the cluster section, the enclosure sleeve having an inside wall and an outside wall, the inside wall forming a gap with respect to the flexible substrate for relative movement therebetween, the enclosure sleeve being received through a hollow portion formed in a hinge;
a first water resistant member, which comprises a base forming a hollow channel and an insertion end extending from the base, the insertion end being mountable to the first end of the enclosure sleeve; and
a second water resistant member, which comprises a base forming a hollow channel and an insertion end extending from the base, the insertion end being mountable to the second end of the enclosure sleeve;
wherein the first water resistant member, the second water resistant member, and the enclosure sleeve are combined together and arranged at a selected section of the flexible substrate to form a water resistant section.

2. The bundled flexible circuit board based flat cable with water resistant section as claimed in claim 1, wherein the insertion end of the first water resistant member is fit to one of an inside wall and an outside wall of the first end of the enclosure sleeve.

3. The bundled flexible circuit board based flat cable with water resistant section as claimed in claim 1, wherein the insertion end of the second water resistant member is fit to one of an inside wall and an outside wall of the second end of the enclosure sleeve.

4. The bundled flexible circuit board based flat cable with water resistant section as claimed in claim 1, wherein the enclosure sleeve is made of a material selected from a group consisting of metal, plastic, resin, silicon rubber, rubber, and silicon gel.

5. The bundled flexible circuit board based flat cable with water resistant section as claimed in claim 1, wherein each of the water resistant members is made of a material selected from a group consisting of silicon rubber, rubber, silicon gel, plastic, and resin.

6. The bundled flexible circuit board based flat cable with water resistant section as claimed in claim 1, wherein the base of the first water resistant member comprises an outer enclosure body enclosing an outer surface of the base of the first water resistant member.

7. The bundled flexible circuit board based flat cable with water resistant section as claimed in claim 6, wherein the base of the first water resistant member is made of a material selected from a group consisting of metal, plastic, resin, silicon rubber, rubber, and silicon gel, and the outer enclosure body is made of a material selected from a group consisting of silicon rubber, rubber, silicon gel, and resin.

8. The bundled flexible circuit board based flat cable with water resistant section as claimed in claim 1, wherein the base of the second water resistant member comprises an outer enclosure body enclosing an outer surface of the base of the second water resistant member.

9. The bundled flexible circuit board based flat cable with water resistant section as claimed in claim 8, wherein the base of the second water resistant member is made of a material selected from a group consisting of metal, plastic, resin, silicon rubber, rubber, and silicon gel, and the outer enclosure body is made of a material selected from a group consisting of silicon rubber, rubber, silicon gel, and resin.

10. The bundled flexible circuit board based flat cable with water resistant section as claimed in claim 1, wherein the flexible substrate undergoes relative displacement with respect to the first water resistant member, the second water resistant member, and the enclosure sleeve when subjected to a stretching force in the extension direction or a torque applied in a rotation direction thereof.

11. The bundled flexible circuit board based flat cable with water resistant section as claimed in claim 1, wherein the enclosure sleeve and the first water resistant member are made of the same material and are integrally formed together.

12. The bundled flexible circuit board based flat cable with water resistant section as claimed in claim 1, wherein the enclosure sleeve and the second water resistant member are made of the same material and are integrally formed together.

* * * * *